J. Ridgeway, Jr.,
Cock.

No. 55. Reissued Sep. 23, 1843.

N. PETERS, PHOTO-LITHOGRAPHER, WASHINGTON, D. C.

UNITED STATES PATENT OFFICE.

JONATHAN RIDGWAY, JR., OF NEW YORK, N. Y., ADMINISTRATOR OF J. RIDGWAY, DECEASED.

IMPROVEMENT IN STOP-COCKS FOR TAPPING PIPES UNDER PRESSURE.

Specification forming part of Letters Patent No. 2,563, dated April 16, 1842; Reissue No. 55, dated September 23, 1843.

*To all whom it may concern:*

Be it known that JONATHAN RIDGWAY, late of the city and county of New York, deceased, did invent a new and useful Improvement in Making Stop-Cocks and Boring Water-Pipes or other Vessels under Pressure; and that I, JONATHAN RIDGWAY, Jr., of the said city, administrator of the said deceased, do hereby declare the following to be a full, clear, and exact description thereof, reference being had to the accompanying drawings, making a part of this specification, in which—

Figure 1:
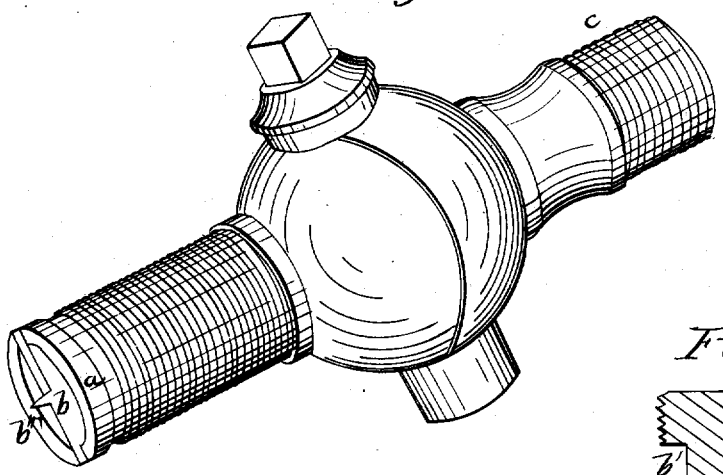
Figure 2:
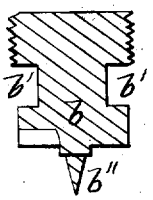

Figure 1 is a perspective of cock; Fig. 2, the cutter attached.

On that end of a stop-cock which is to be inserted into a pipe or vessel is affixed a cutter, *b*, in the following manner: A flat piece of metal (see Fig. 2) having a square notch, *b'*, in each side, a point, *b''*, projecting from the center of its lower edge, which is beveled off on each side, so as to form cutters turning in opposite directions. Above the notches *b'* the edges are serrated to conform to the shape of the thread of a screw. This piece of metal is inserted into the core, around which a stop-cock of any of the ordinary forms is cast, and thus firmly affixed thereto, having a ring of metal extending entirely around where the notches *b'* are. A groove can be turned in this ring into which packing can be inserted, if necessary. The projecting sides of the cutter extend through to the outside to assist in the operation of cutting. A stop-cock is thus formed that will cut and screw its way into the metal or wood, the cutters being constructed either for the one or the other. When a branch pipe is to be attached, a screw is made on the end *c* opposite to the cutter, and for facility in turning it a drill-brace may be temporarily attached thereto. By means of this instrument pipes or vessels of any description can be tapped and the stop-cock inserted at one operation under pressure without losing any part of their contents.

In constructing these stop-cocks it is not intended to adhere in all cases to the precise method just described of forming the cutters. They may be made to screw on, or be attached in any of the ways well known to practical mechanics.

The instrument above described possesses two general properties: first, it is a superior boring-tool, so constructed that before the point of it has passed through a water-pipe of ordinary thickness a ring or cylindrical surface enters the orifice and prevents the escape or loss of any of the contents; second, when provided with a spigot or turning valve, it not only taps or bores the pipe under pressure, but forms a branch for conducting off the contents of the pipe or vessel so tapped. It may also be applied to boring out sand-holes or other defective spots in pipes or other vessels already in use, and to plugging them permanently. In this case the cutting-edge, the ring, and tap or threads for cutting the screw form together a solid plug which will bore out the defective part and work its way into the place of it, there to remain permanently, if desired.

What is here claimed as new, and desired to be secured by Letters Patent, is—

The combination of the drill or cutting-edge with the ring or cylindrical follower, whether packed or not, as herein fully described, by which the hole is bored and the fluid contents of the pipe or vessel prevented from escaping between the instrument and the sides of the orifice so drilled, also these in combination with the tap or threads for cutting the screw in the pipe or vessel, as described, and, further, the combination of the cutter and ring, whether packed or not, with the faucet or stop cock made in any of the usual ways, in the manner and for the purpose herein described.

JONATHAN RIDGWAY, JR.,
*Administrator of the estate Jonathan Ridgway, deceased.*

Witnesses:
RICHARD HOWKINS,
EDMUND NESBITT.